United States Patent
Hosokawa

[19]
[11] Patent Number: 6,113,021
[45] Date of Patent: Sep. 5, 2000

[54] ONE-WAY CLUTCH AND BRAKE CONTROL DEVICE USING THE ONE-WAY CLUTCH

[75] Inventor: Koichi Hosokawa, Tokyo, Japan

[73] Assignee: Mitsubishi Denki Kabushiki Kaisha, Tokyo, Japan

[21] Appl. No.: 09/089,215

[22] Filed: Jun. 3, 1998

[30] Foreign Application Priority Data

Jun. 3, 1997 [JP] Japan .................................. 9-145582

[51] Int. Cl.$^7$ ................................................ G03B 19/04
[52] U.S. Cl. ................................ 242/356.6; 242/355.1; 242/415.1; 242/545.1; 192/26
[58] Field of Search ............................ 242/355, 355.1, 242/356.6, 422.4, 415.1, 545.1; 192/336, 26, 415, 56.2; 464/40

[56] References Cited

U.S. PATENT DOCUMENTS

| | | |
|---|---|---|
| 4,492,994 | 1/1985 | Suda et al. . |
| 4,747,564 | 5/1988 | Tsubota ................. 242/355.1 |
| 5,273,229 | 12/1993 | Komatsu .............. 242/545.1 |
| 5,358,195 | 10/1994 | Kang . |
| 5,472,151 | 12/1995 | Choi et al. ........... 242/355.1 X |
| 5,620,372 | 4/1997 | Takada et al. . |
| 5,884,860 | 3/1999 | Ishikawa et al. ........ 242/422.4 X |

FOREIGN PATENT DOCUMENTS

| | | |
|---|---|---|
| 0463248A1 | 1/1992 | European Pat. Off. . |
| 0632440A2 | 1/1995 | European Pat. Off. . |
| 6-66332 | 3/1994 | Japan . |

*Primary Examiner*—Donald P. Walsh
*Assistant Examiner*—William Rivera

[57] ABSTRACT

A one way clutch includes a shaft, a rotation-transmitting member, and a rotating member. The rotating shaft is rotatable about its rotational axis in a first direction and in a second direction opposite to the first direction. The rotating shaft extends through the rotation-transmitting member which is in the form of a coil spring. When the shaft rotates in the second direction, the spring tightly engages the shaft and rotates together with the shaft to transmit rotation of the shaft to the rotating member. When the shaft rotates in the first direction, the spring loosely engages the shaft not to transmit the rotation of the shaft to the rotating member. The rotating member fits over and engages the spring such that the rotating member is axially movable along, but not rotatable relative to the spring. The rotating member is yieldably biased in a third direction parallel to the rotational axis such that the rotating member is allowed to yieldably move in a fourth direction opposite to the third direction when an external rotational load is applied to the rotating member in the fourth direction. Thus, the rotating member is prevented from being locked.

17 Claims, 12 Drawing Sheets

ONE-WAY CLUTCH AND BRAKE CONTROL DEVICE USING THE ONE-WAY CLUTCH

BACKGROUND OF THE INVENTION

Field of the Invention

The present invention relates to a one-way clutch and a brake control device for a magnetic tape drive apparatus, and more particularly to a one-way clutch and an apparatus incorporating this one-way clutch. The one-way clutch transmits the rotation of a rotating shaft only when the shaft rotates in a particular direction, the shaft being rotatable in forward and reverse directions.

With conventional magnetic recording/reproducing apparatuses such as a VTR, a reel disc is driven in rotation so that a reel placed on the reel disc is rotated to take up the magnetic tape. The tape take-up operation requires a few kinds of brakes used for their specific tasks.

A light braking force is applied to the rotating reel discs during, for example, the rewinding operation of the magnetic tape. A large braking force is applied to the rotating reel discs to bring the discs into instant stop when the tape should be stopped. The braking device for generating this large braking force is not activated during the rewinding operation but activated upon a stop command at the end of the rewinding operation.

In order to stop the tape at a desired position, a braking device should be activated as quickly as possible. For instantly applying a braking force, a mechanism referred to as one-way clutch is conventionally used.

FIGS. 8 and 9 illustrate a brake control device that controls a braking operation for a reel disc of a magnetic recording/reproducing apparatus. FIG. 8 illustrates a relevant portion of the construction of a conventional magnetic tape drive mechanism when a brake force is acting on a reel 8. FIG. 9 is a cross-sectional view taken along lines I—I of FIG. 8.

A brake member 1 is rotatably supported on a shaft 10 and has a brake pad 12 and a projection 13 located offset from the shaft 10. The brake member is urged by a tension spring 11 in a direction shown by arrow D. The urging force of the spring 11 causes the brake member 1 to rotate clockwise (shown by arrow E) about the shaft 10, so that the brake pad 12 is pressed against the side surface of the reel disc 8. A frictional force developed between the brake pad 12 and the reel disc 8 applies a braking force to the reel disc 8. When the reel disc 8 is rotating in a direction shown by arrow G, a light brake force is applied to the reel disc 8. When the reel disc 8 is rotating in a direction shown by arrow H, a full brake force is applied to the reel disc 8.

A brake-disabling member 2 is a plate cam formed with a cam portion 2b (beveled portion) and is laterally movable in directions shown by arrows A and C. The brake-disabling member 2 is urged by a tension spring 20 in the direction shown by arrow C and abuts a stopper, not shown. When the brake-disabling member 2 is moved in the directions shown by arrow A and C in FIG. 8, the projection 13 engages and moves along the cam portion 2b, so that the brake member 1 is rotated clockwise (shown by arrow E) or counterclockwise (shown by arrow F). The rotation of the brake member 1 in the direction shown by arrows C or A causes the brake pad 12 to move into or out of friction engagement with the reel disc 8.

Referring to FIG. 8, the projection 13 is in contact with a recess 2a (flat portion) of the brake-disabling member 2 where the brake member 1 has rotated fully in the direction shown by arrow E and the brake pad 12 is pressed against the reel disc 8. When the brake-disabling member 2 is moved in the direction shown by arrow A, the cam portion 2b of the brake-disabling member 2 pushes the brake member 1 out of the way so that the brake member 1 rotates in the direction shown by arrow F. Thus, the brake pad 12 is moved completely out of engagement with the reel disc 8.

The tension spring 20 biases at all times the brake-disabling member 2 in a direction shown by arrow C. Therefore, when the brake-disabling member 2 is released from where the brake-disabling member 2 has moved fully in the direction shown by arrow A, the brake-disabling member 2 instantly moves in the direction shown by arrow C with the aid of the biasing force of the tension spring 20 till the brake-disabling member 2 abuts the stopper, so that the projection 13 slides along the cam portion 2b toward the recess 2a and correspondingly the braking member 1 quickly rotates in the direction shown by arrow E. Thus, the rotation of the reel disc 8 is quickly reduced or brought to a stop.

A trigger member 3 is rotatably supported on a pin 30 mounted to the brake-disabling member 2. One end of the trigger member 3 is coupled to the brake-disabling member 2 via a tension spring 31. Thus, if the trigger member 3 is rotated clockwise about the pin 30 and subsequently released, the trigger member 3 returns to its original position with the aid of the tension force of the tension spring 31. The trigger member 3 has an engagement portion 32 and an engagement projection 33 which are substantially diametrically opposite to each other with respect to the pin 30.

The drive member 9 is a cam having an engagement portion 91 that engages the trigger member 3 at the engagement projection 33, and is supported on a shaft 90 driven by a motor, not shown. When the rotating member 9 is rotated by the motor in a direction shown by the arrow B, the engagement portion 91 will move into abutting engagement with the engagement portion 33, pushing and move the trigger member 3 together with the brake-disabling member 2 in the direction shown by arrow A.

FIG. 10 is a partial view of the rotating vanes 60 shown in FIGS. 8 and 9. A one-way clutch includes a rotating shaft 50, rotating vane member 6, clutch spring 7, and trigger member 3. The shaft 5 is rotated in either forward direction or reverse direction by a motor, not shown.

The clutch spring 7 is a coil spring that is tightly fitted to the shaft 50. The clutch spring 7 has an inner diameter slightly smaller than the outer diameter of the shaft 50 and is tightly fitted to the shaft 50. Thus, when the shaft 50 rotates without a load, the clutch spring 7 rotates together with the shaft 50 in the forward or reverse direction.

The rotating vane 6 is a hollow cylinder through which the shaft 50 extends so that the rotating vane is rotatable with respect to the shaft 50. The rotating vane 6 is formed with a slit 61 therein that extends parallel to the axis of rotation of of the shaft 50.

A free end 70 of the clutch spring 7 projects through the slit 61 radially outwardly of the rotating vane 6, thereby transmitting the rotation of the clutch spring 7 to the rotating vane 6. Thus, when the shaft 50 rotates without a load, the rotating vane 6 rotates together with the shaft 50 in the forward or reverse direction.

The rotating vane member 6 includes one or more vanes 60. When the trigger member 3 is moved in the direction shown by arrow A as shown in FIG. 8 so that the engagement portion 32 enters the rotation path of the vanes 60, the vane 60 moves into engagement with the engagement portion 32.

When the shaft 50 is rotating in a direction shown by arrow L and the engagement portion 32 interferes with the vane 6, the clutch spring 7 becomes loose with respect to the shaft 50. Therefore, the shaft 50 rotates continues to rotate while the clutch spring 7 and rotating vane 6 will not rotate.

When the shaft 50 is rotating in a direction shown by arrow J and the engagement portion 32 interferes with the vane 60, the clutch spring 7 holds the shaft 50 more firmly thereby transmitting the rotation of the shaft to the rotating vane 60. Thus, the engagement portions 32 is pushed out of the rotation path of the vanes 60. In this manner, the clutch spring 7 transmits the rotation of the shaft 50 to the rotating vane 6 only when the shaft 50 rotates a specific direction.

FIGS. 11–14 illustrate the operation of the one-way clutch device. FIG. 11 shows the engagement portion 91 and the projection 33 when the engagement portion 91 is rotated in the direction shown by arrow B, where the engagement portion 91 and the projection 33 are not in engagement with each other yet. The trigger member 3 remains at rest till the drive member 91 driven by a motor is not in engagement with engagement projection 33. Thus, the clutch spring 7 transmits the rotation of the shaft to the rotating vane 6 so that the rotating vane 6 rotates in the direction shown by arrow J.

FIG. 12 illustrates the drive member 9 when the engagement portion 91 rotating in the B direction pushes the trigger member 3 in the direction shown by arrow A. The engagement portion 32 is pushed at 33 by the engagement portion 91 to enter the rotation path of the vane 60. The engagement portion 32 engages the vane 60 to apply a rotational load so that the clutch spring 7 becomes loose with respect to the shaft 50. Thus, the clutch spring no longer transmits the rotation of the shaft 50 and the rotating vane 6 stops rotating.

FIG. 13 illustrates the shaft 50 rotating in the L direction when the engagement portion 91 rotating in the B direction pushes the trigger member 3 in the direction shown by arrow A. The clutch spring 7 firmly holds the shaft 50 to transmit the rotation of the shaft 50 to the rotating vane 6. The engagement portion 32 is pushed at 33 by the engagement portion 91 to enter the rotation path of the vane 60. The engagement portion 32 engages the vane 60 to apply a rotational load. However, the clutch spring firmly holds the shaft 50 to continue to transmit the rotation of the shaft 50. As a result, the vane 60 repels the engagement portion 32 out of its rotation path in a direction of centrifugal force. The trigger member 3 rotates about the shaft 30 so that the engagement projection 33 pops out of engagement with the engagement portion 91.

FIG. 14 illustrates the trigger member 3 shortly after the trigger member 3 has been repelled out of the rotation path of the vane 60. Since the trigger member 3 has become out of engagement with the engagement portion 91, the trigger member 3 instantly moves together with the brake-disabling member 2 in the direction shown by arrow C due to the urging force applied by the tension spring 20, thereby applying a large braking force to the reel disc 8. The trigger member 3 also rotates in a direction shown by arrow P and returns to its original position shown in FIG. 11 since the tension spring 31 pull back the trigger member 3 as shown FIG. 8.

With the aforementioned conventional one-way clutch apparatus, the movement of the rotating vane 6 along the shaft 50 is restricted by bearings. Therefore, when the engagement portion 32 collides with the vane 60, the trigger member 3 may be caught between the vane 60 and the engagement portion 91, i.e., "locked condition".

The rotating vane 6 needs at least one vane 60 that engages the engagement portion 32. However, if the rotating vane 6 has only one vane 60, there is a problem. That is, depending on the rotational position of the vane 60, the rotating vane 6 may need to rotate through almost one complete rotation before the engagement portion 32 engages the vane 60 when the shaft is rotated in a reverse direction. This causes a loss in time when rotating in a reverse direction.

If the rotating vane 6 has many vanes 60, the loss in time during the reverse rotation of the shaft 50 decreases, so that the brake device is activated more quickly.

In this case, an increased number of vanes 60 causes an increased chance of the vane 60 colliding with the engagement portion 32, thus eventually increasing the chance of being locked.

SUMMARY OF THE INVENTION

The present invention was made to address the aforementioned problem.

An object of the invention is to provide a one-way clutch device where the engagement portion is prevented from becoming locked to its mating engagement portion so that the smooth operation is ensured.

Another object of the invention is to provide a reliable brake controlling apparatus where lock-free one-way clutch device is utilized.

Yet another object of the invention is to provide a reliable magnetic tape drive apparatus where a lock-free one-way clutch device is utilized.

A one way clutch includes a rotating shaft, a rotation-transmitting member, and a rotating member. The rotating shaft has a rotational axis and is rotatable about the rotational axis in a first direction and in a second direction opposite to the first direction. The rotating shaft extends through the rotation-transmitting member which is in the form of, for example, a coiled spring. The rotation-transmitting member rotates together with the shaft when the rotation-transmitting member is tightly engaged with the shaft, and does not rotate when the rotation-transmitting member is loosely engaged with the shaft. The rotation-transmitting member is received in the rotating member such that the rotating member is axially movable along, but not rotatable relative to, the rotation-transmitting member. The rotating member rotates together with the rotation-transmitting member when the rotation transmitting member is tightly engaged with the shaft. A biasing member yieldably bias the rotating member to slidably move in a predetermined direciton along the shaft. The rotating member causes the rotation-transmitting member to loosely engage the shaft when the shaft rotates in the first direction with a rotational load larger than a predetermined value exerted on the rotating member. The rotating member causes the rotation-transmitting member to tightly engage the shaft when no rotational load is exerted on the rotating member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
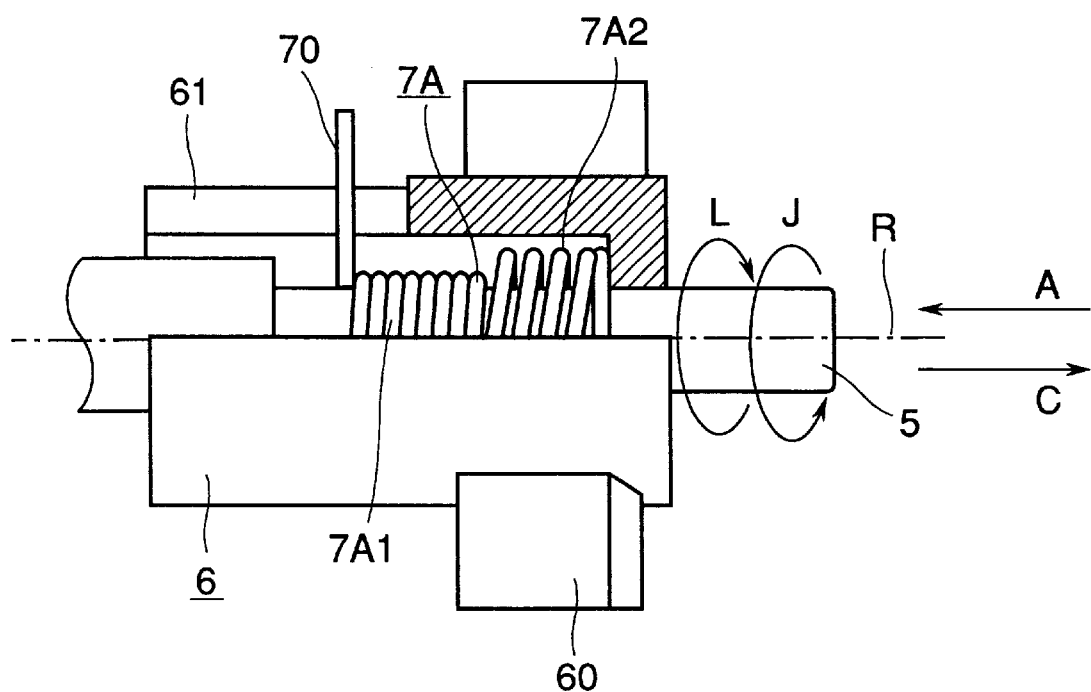
FIG. 1 is a partial cross-sectional view of a one-way clutch device according to a first embodiment.

The invention will be described in detail with reference to the accompanying drawings.

Elements corresponding to those of the conventional magnetic tape drive device have been given the same reference numerals and the description thereof have been omitted.

First embodiment

Figure 8:
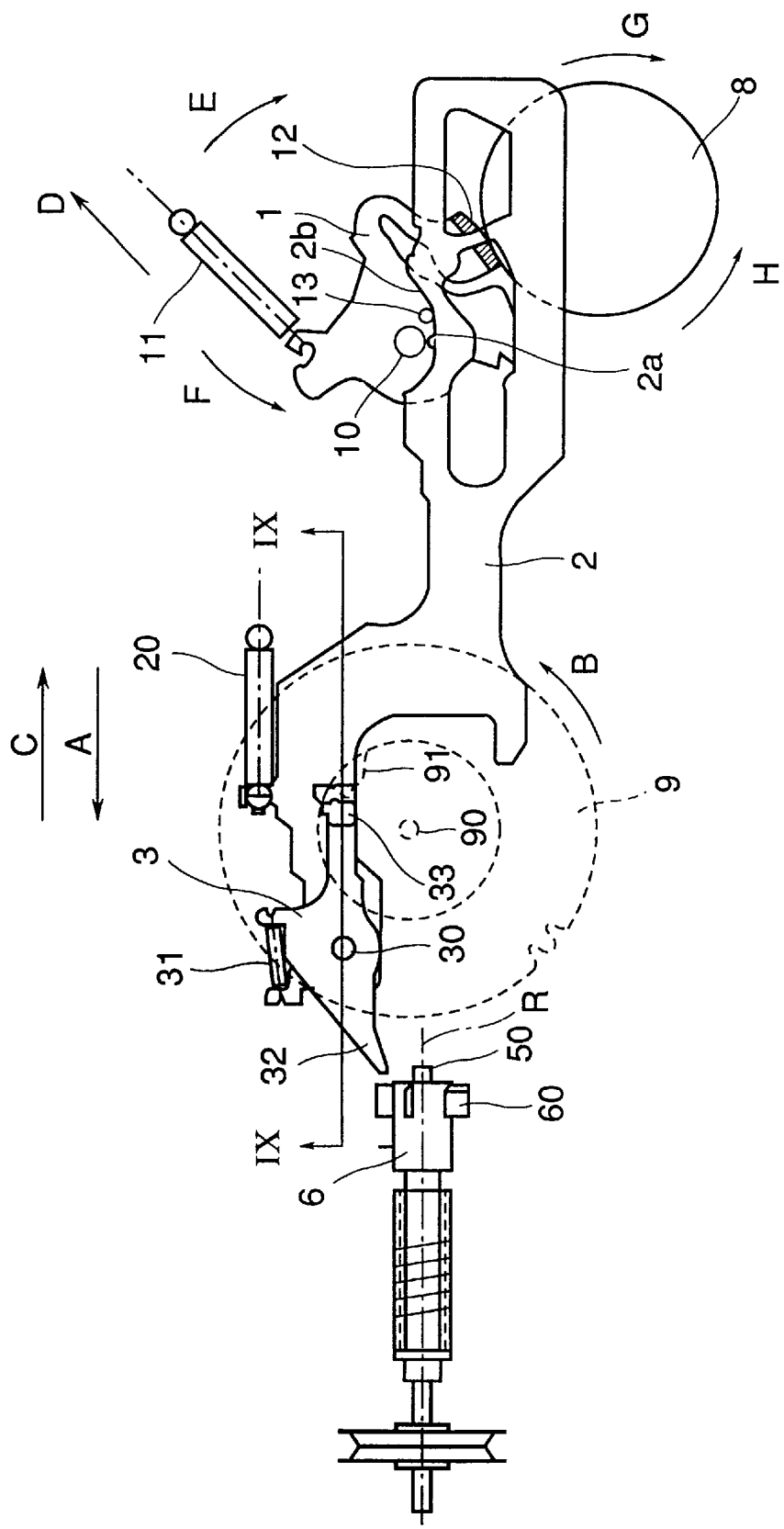
FIG. 8 illustrates a relevant portion of the construction of a conventional magnetic tape drive apparatus.
Figure 9:
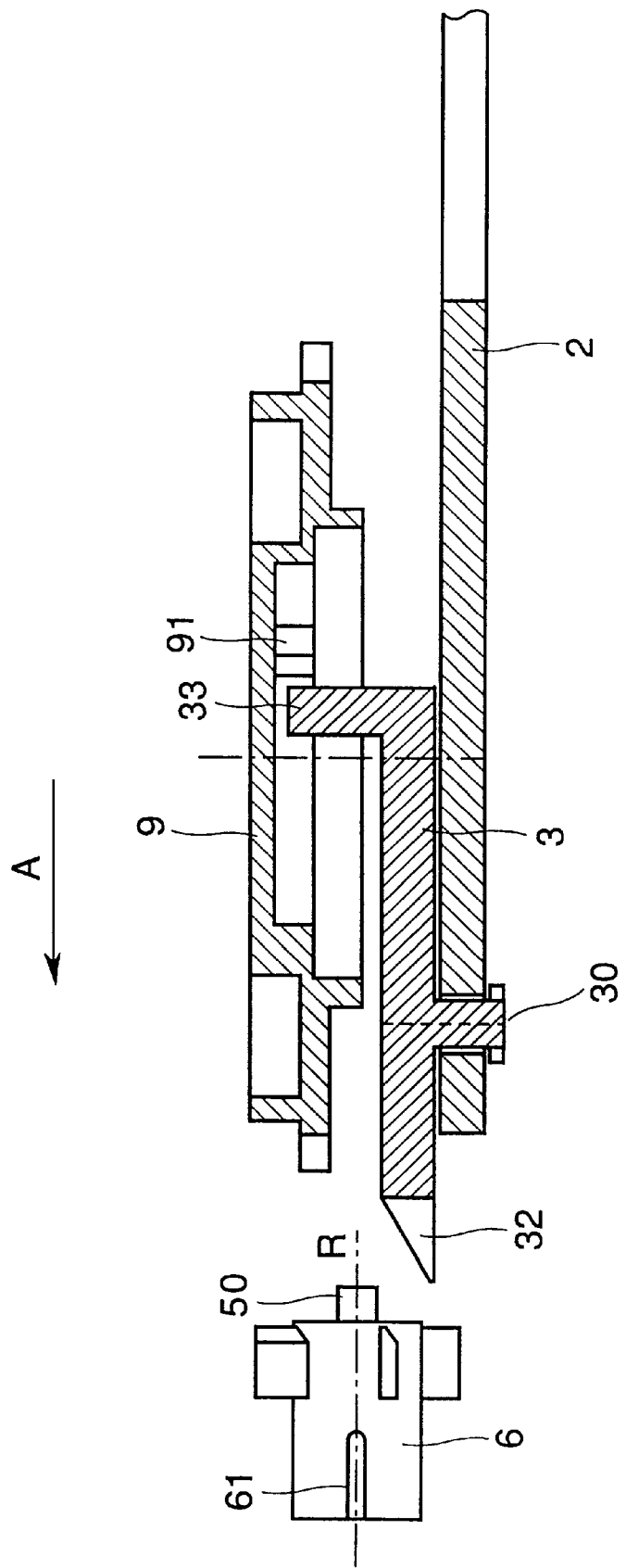
FIG. 9 is a cross-sectional view taken along lines IX—IX of FIG. 8.

FIG. 1 is a partial cross-sectional view of a one-way clutch device according to a first embodiment, showing a rotating vane member for use in the magnetic tape drive device shown in FIG. 8.

A rotating vane member 6 is a hollow sleeve into which a shaft 5 extends. The rotating vane member 6 is rotatable with respect to the shaft 5 and movable between two bearings, not shown, along the rotational axis R of the shaft 5.

A clutch spring 7A includes a closely-wound coil spring 7A1 and a loosely-wound coil spring 7A2. The springs 7A1 and 7A2 are aligned in line with each other and connected to each other. The clutch spring 7A rides coaxially on the shaft 5. The spring 7A2 yieldably biases the rotating vane member 6 in a direction shown by arrow C when the rotating vane member 6 moves in a direction shown by arrow A.

A closely-wound coil spring is a coil spring where when no external force is exerted, there is little or no gap between adjacent turns. The closely-wound coil spring is usually used to tight-fit a shaft. A loosely-wound coil spring is a coil spring where when no external force is exerted, there is some gap between adjacent turns. The loosely-wound coil spring is used as a compression spring.

The closely-wound coil spring 7A1 has a free end portion 70 which projects through the slit 61 radially outwardly of the rotating vane member 6.

The slit 61 extends parallel to the rotational axis of the shaft 5 so that the rotating vane member 6 is movable along the shaft 5 to some extent.

The longitudinal end of the loosely-wound coil spring 7A2 remote from the closely-wound coil spring 7A1 is in contact with the inner end surface of the rotating vane member 6 which is substantially perpendicular to the longitudinal axis of the shaft 5. The loosely-wound coil spring 7A2 yieldably biases the rotating vane member 6 in the direction shown by arrow C, i.e., opposite to the direction A in which the engagement portion 32 (FIG. 8) of the trigger member enters the path of rotation of the vane 60.

The closely-wound coil spring 7A1 has an inner diameter smaller than the outer diameter of the shaft 5. Thus, the closely-wound coil spring 7A1 is tightly fitted to the shaft 5.

When the shaft 5 is rotating in the direction shown by arrow J or L and no external rotational load is exerted on the rotating vane member 6, the clutch spring 7 holds the shaft 5 firmly, thereby transmitting the rotation of the shaft to the rotating vane member 6.

When the shaft 5 is rotating in the direction shown by arrow J and an external rotational load larger than a predetermined value is exerted on the rotating vane member 6, the clutch spring 7A loosely holds the shaft 5, thereby not transmitting the rotation of the shaft 5 to the rotating vane member 6.

When the shaft 5 is rotating in the direction shown by arrow L and an external rotational load is exerted on the rotating vane member 6, the clutch spring 7 still firmly holds the shaft 5, thereby transmitting the rotation of the shaft to the rotating vane member 6. Thus, the engagement portion 32 (FIG. 8) entering the rotation path of the rotating vane member 6 is repelled out of the rotation path of the vanes 60.

In this manner, the clutch spring 7 transmits the rotation of the shaft 5 to the rotating vane 6 only when the shaft 5 rotates in a specific direction.

It is to be noted that the loosely-wound coil spring 7A2 has a larger inner diameter than the outer diameter of the shaft 5. The loosely-wound coil spring 7A2 functions as a compression spring which is compressed between the closely-wound coil spring 7A1 and the rotating vane member 6.

Thus, if the engagement portion 32 entering the rotation path of the vane 60 collides with the vane 60, the loosely-wound coil spring 7A2 yieldably allows the rotating vane member 6 to move against the biasing force of the loosely-wound coil spring 7A2 along the shaft 5, thereby preventing the rotating vane member 6 and the engagement portion 32 from being locked to each other.

The rotating vane member 6 then returns to its original position along the shaft 5 with the aid of the urging force of the loosely-wound coil spring 7A2, as soon as the collision between the engagement portion 32 and the vane 60 is removed. In this manner, the rotating vane member 6 will have returned to its original position before the next vane 60 rotates to the location of the engagement portion 32, so that the engagement portion 32 enters the rotation path of the vane 60.

Thus, the engagement portion 32 is allowed to engage the vane 60 without being locked to each other.

If the shaft 5 is rotating in the J direction, the clutch spring 7A becomes loose, thereby bringing the rotating vane 6 to a stop.

If the shaft 5 is rotated in the L direction, the clutch spring 7A firmly holds the rotating shaft so that the rotating member 6 rotates together with the clutch spring 7A and the rotating vane 6 repels the engagement portion 32 out of the rotation path of the rotating vane 6 just as in the conventional one-way clutch device.

The ratio of the size of the closely-wound coil spring 7A1 to that of the loosely-wound coil spring 7A2 may be selected in accordance with a required tight-fitting force of the closely-wound coil spring 7A1 and a biasing force of the loosely-wound coil spring 7A2. The clutch spring 7A may be designed such that the coil gradually changes from a closely-wound part to a loosely-wound part.

Second embodiment

Figure 2:
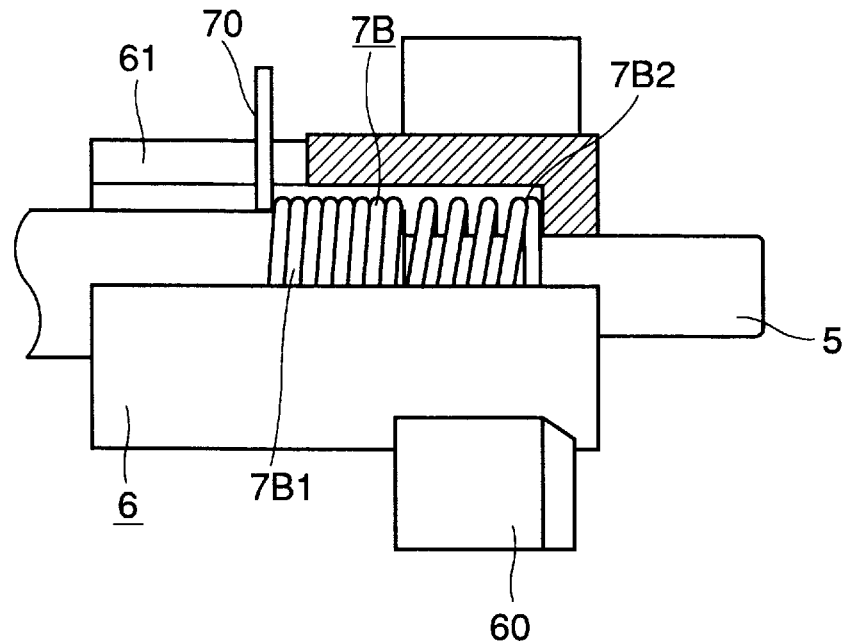
FIG. 2 is a partial cross-sectional view, illustrating a part of a construction of a one-way clutch device according to a second embodiment.

FIG. 2 is a partial cross-sectional view, illustrating a part of a construction of a one-way clutch device according to a second embodiment. The construction shown in FIG. 2 is for use in the magnetic tape drive apparatus as shown in FIG. 8, and includes a shaft, a rotating vane member, and a clutch spring.

The rotating vane member 6 is of the same construction as that shown in FIG. 1. One half of the clutch spring 7B is a closely-wound coil spring 7B and the other half is a loosely-wound coil spring 7B2. Unlike the clutch spring 7A of the first embodiment, the closely-wound coil spring 7B1 has the same diameter as the loosely-wound coil spring 7B2. However, it is to be noted that a portion of the shaft 5 extending through the closely wound coil spring 7B1 has a larger diameter than a portion extending through the loosely-wound coil spring 7B2. The operation of the one-way clutch is the same as in the first embodiment.

Third embodiment

Figure 3:
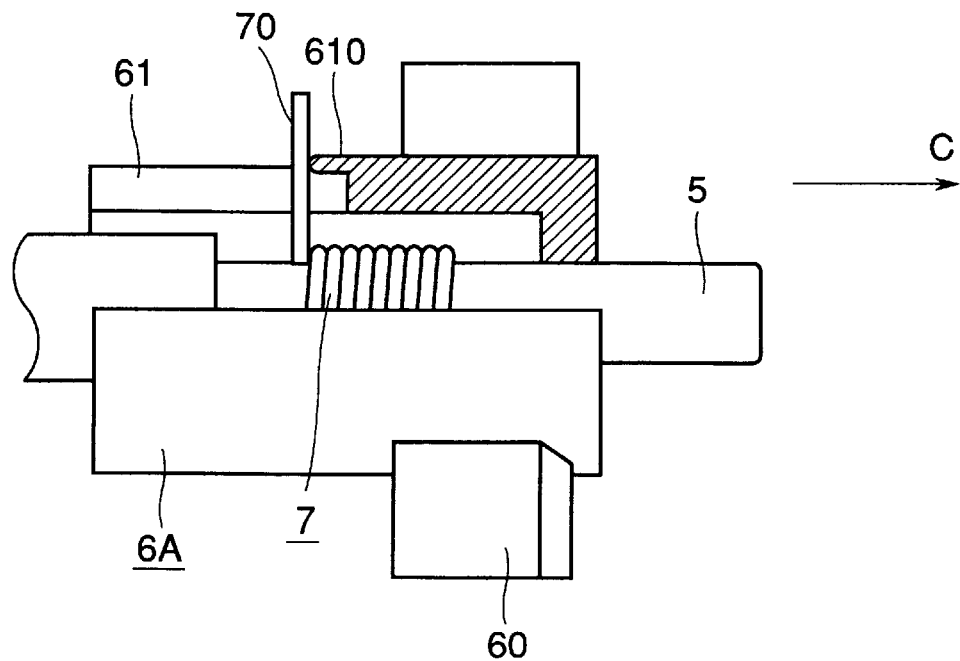
FIG. 3 is a partial cross-sectional view, illustrating a part of a construction of a one-way clutch device according to a third embodiment.

FIG. 3 is a partial cross-sectional view, illustrating a part of a construction of a one-way clutch device according to a third embodiment. The construction shown in FIG. 3 is for use in the magnetic tape drive apparatus as shown in FIG. 8, and includes a shaft, a rotating vane member, and a clutch spring.

Figure 10:
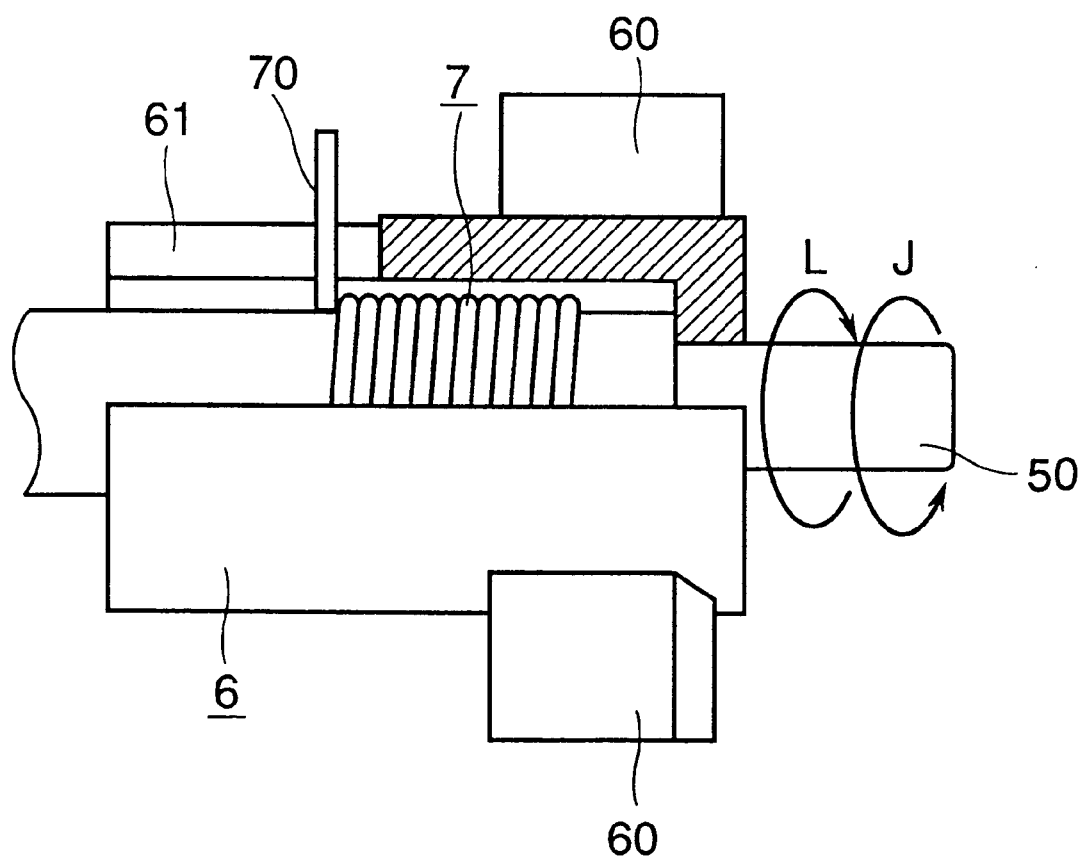
FIG. 10 is a partial view of the rotating vanes 6 shown in FIGS. 8 and 9.
Figure 11:
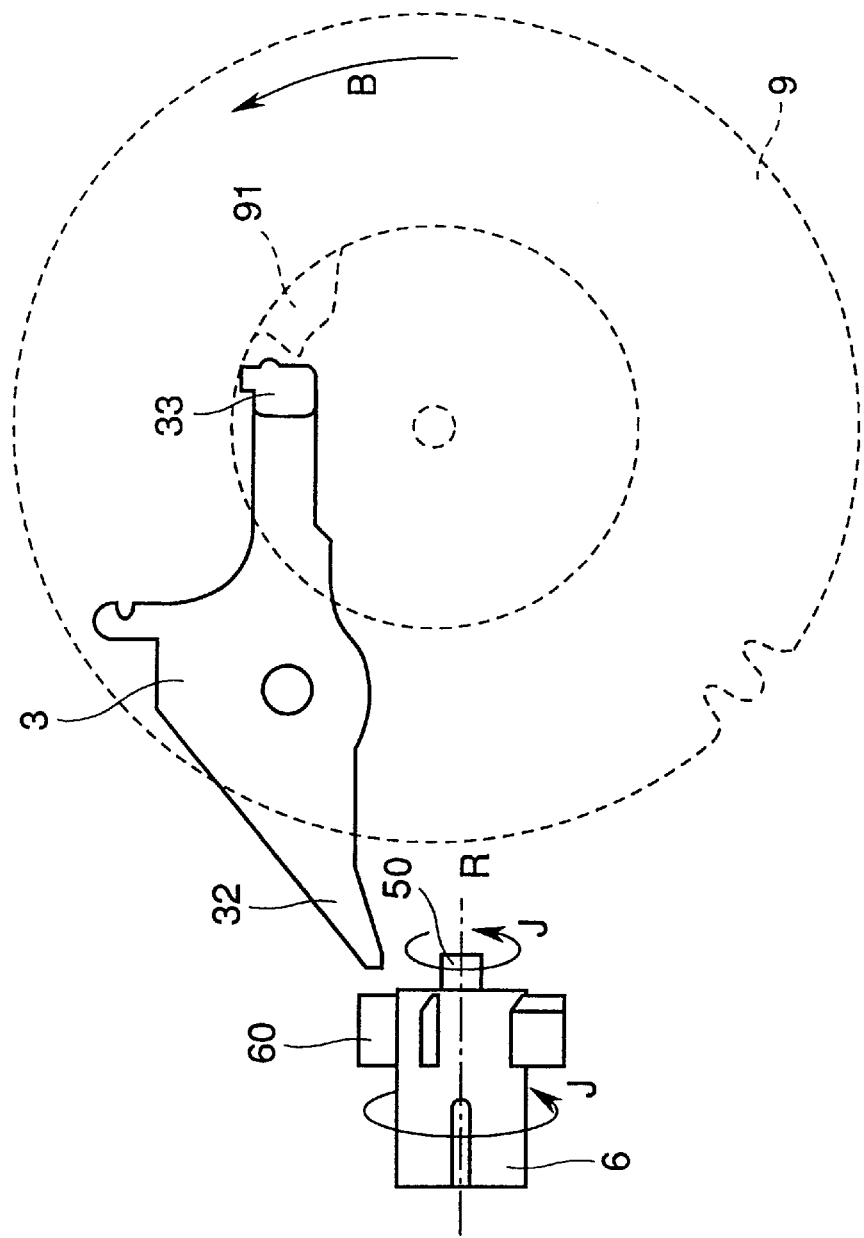
FIG. 11 shows the engagement 91 and the projection 33 when they are not in engagement with each other.
Figure 12:
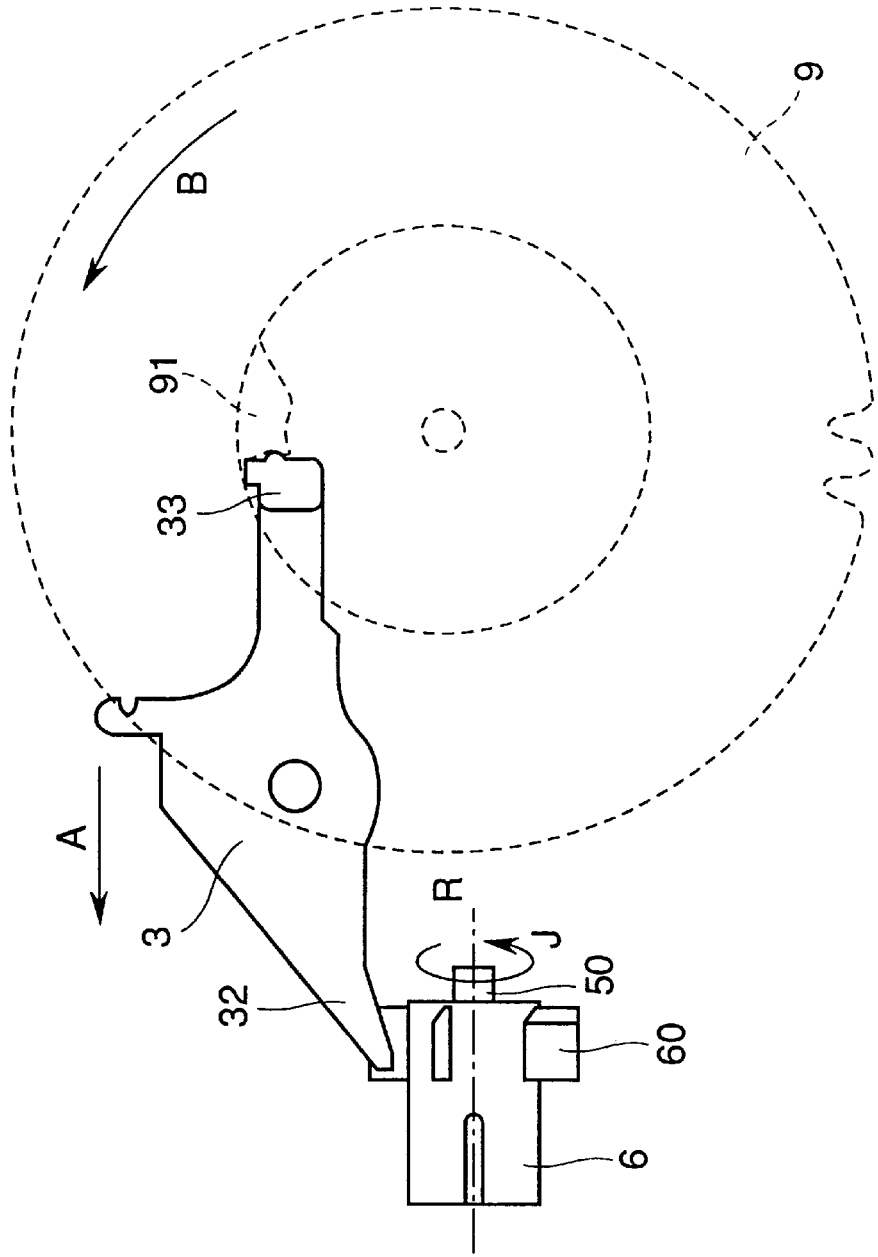
FIG. 12 illustrates the drive member 9 when it is rotated in the direction shown by arrow B.
Figure 13:
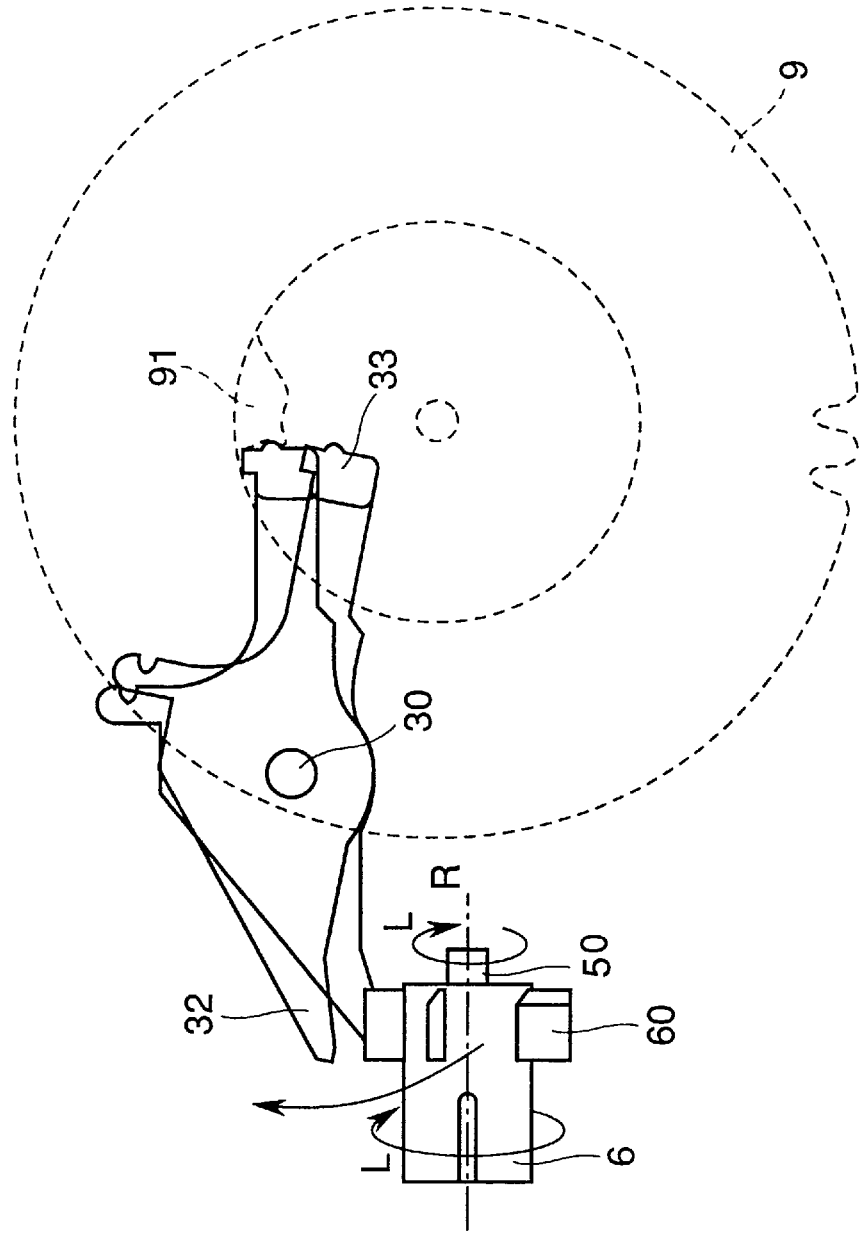
FIG. 13 illustrates the shaft 5 when it is rotated in the L direction.

The shaft 5 and clutch spring 7 are of a similar construction to the conventional art as shown in FIG. 10 where the clutch spring 7 is tightly fitted to the shaft 5. A rotating vane member 6A is mounted on the shaft 5 and is slidable along the rotational axis of the shaft 5. The free end portion 70 of the clutch spring 7 projects through the slit 60 radially outwardly from the shaft 5. The free end portion 70 abuts a projection 610 formed at an end of the slit 61.

If the engagement portion 32 of the trigger member 3 entering the rotation path of the vane 60 collides the vane 60, then the rotating vane member 61 slides along the shaft 5 away from the free end of the shaft 5, thereby preventing the vane 60 and the engagement portion 32 from being locked to each other. Since the rotating vane member 6 moves along the shaft 5, the projection 610 pushes the free end portion 70 of the clutch spring 7. Thus, the free end portion 70 resiliently applies an urging force to the projection 610 in the C direction, pushing back the rotating vane member 6 to its original position shortly after the collision.

Fourth embodiment

Figure 4:
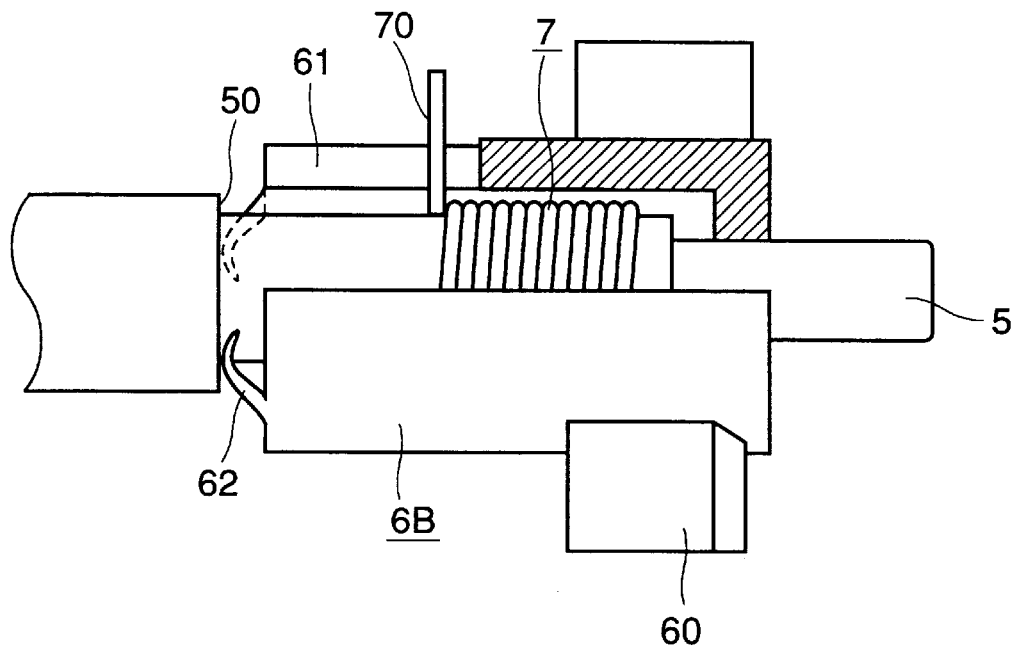
FIG. 4 is a partial cross-sectional view, illustrating a part of a construction of a one-way clutch device according to a fourth embodiment.

FIG. 4 is a partial cross-sectional view, illustrating a part of a construction of a one-way clutch device according to a third embodiment. The construction shown in FIG. 2 is for use in the magnetic tape drive apparatus as shown in FIG. 8, and includes a shaft, a rotating vane member, and a clutch spring.

The shaft 5 and clutch spring 7 are similar construction to the conventional art as shown in FIG. 10 where the clutch spring 7 is tightly fitted to the shaft 5. A rotating vane member 6B is mounted on the shaft 5 and is slidable along the rotational axis of the shaft 5 just as that shown in FIG. 1. The free end portion 70 of the clutch spring 7 extends through the slit 61 radially outwardly from the shaft 5.

The rotating vane member 6B is molded from a resin and has one or more resilient projections 62 at an end of the rotating member 6B remote from the free end of the shaft 5. The resilient projections 62 are strip-shaped springs molded in one piece construction with the rotating vane member 6B, and project radially inwardly of the rotating vane 6. The free end portions of the projections 62 resiliently abut an abutting surface 50 of the shaft 5. The abutting surface 50 is an end surface of the large diameter portion of the shaft 5, perpendicular to the rotational axis of the shaft 5.

The abutting surface 50 may be a surface of a member other than the shaft 5 as far as it is perpendicular to the axis of the shaft 5. For example, a side surface of a bearing that supports the shaft 5 may be used as the abutting surface. In order that the resilient projections 62 are least worn out due to friction, the abutting surface 50 should be selected by taking into consideration such factors as the ratio of the time during which the 6B rotates relative to the abutting surface to that during which the 6B stops relative to the abutting surface. The surface 50 shown in FIG. 4 is the most appropriate for least wear-out of the resilient projections 62.

When the engagement portion 32 collides with the vane 60, the engagement portion 32 and vane 60 are not locked to each other but the resilient projections 62 resiliently yieldably allows the rotating vane member 6B to move toward the surface 50. Then, the resilient force of the resilient projections 62 pushes the rotating vane member 6B back to its original position shortly after the collision.

Fifth embodiment

Figure 5:
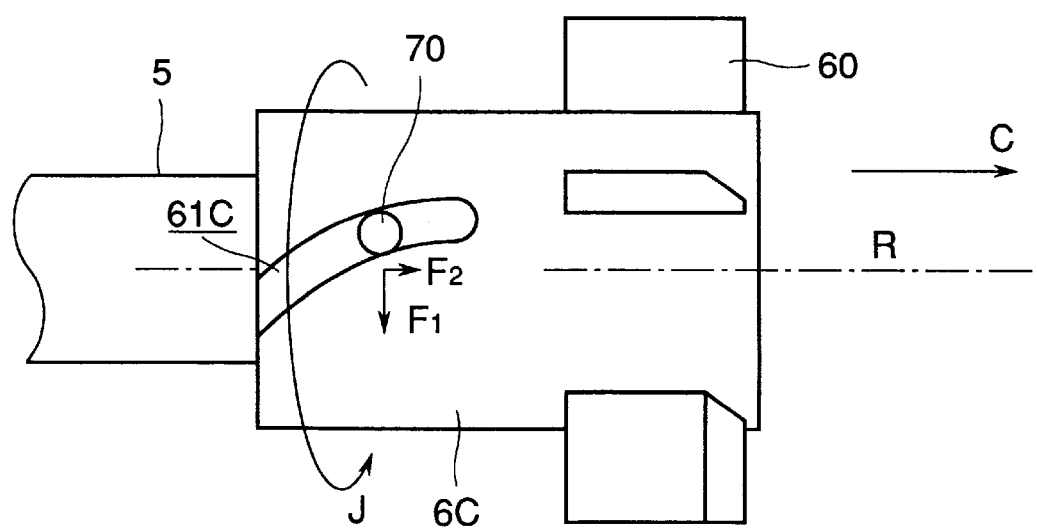
FIG. 5 illustrates a part of a construction of a one-way clutch device according to a fifth embodiment.

FIG. 5 illustrates a part of a construction of a one-way clutch device according to a fifth embodiment. The construction shown in FIG. 5 is for use in the magnetic tape drive apparatus as shown in FIG. 8, and includes a shaft, a rotating vane member, and a clutch spring.

The shaft 5 and clutch spring 7 are of the same construction as the conventional art as shown in FIG. 10 where the clutch spring 7 is tightly fitted to the shaft 5. A rotating vane member 6C is mounted on the shaft 5 and is slidable along the rotational axis R of the shaft 5 just as that shown in FIG. 1. The free end portion 70 of the clutch spring 7 extends through the slit 60 radially outwardly from the shaft 5. The slit 61c is formed to run in a spiral path about the shaft 5.

In other words, the slit 61C is at an angle with the rotational axis R of the shaft 5. Therefore, when the shaft 5 rotates together with the clutch spring 7 in a direction shown by arrow J, the force exerted on the rotating vane member 6C via the clutch spring 7 is resolved into a force F1 and a force F2. The force F1 causes the vane member 6C to rotate together with the shaft 5 while the force F2 causes the vane member 6C to move along the shaft 5 in the C direction.

Thus, for example, if the clutch spring 7 becomes loose when the shaft 5 is rotating in the direction shown by arrow J, the rotating vane member 6C is moved along the shaft 5 without being locked after the engagement portion 32 has collided with the rotating vane member 6C. Then, the rotating vane member 6C moves back along the shaft 5 toward its original position with the aid of the force F2. This ensures that the engagement portion 32 engages the vane 60 without being locked to each other.

Sixth embodiment

Figure 6:
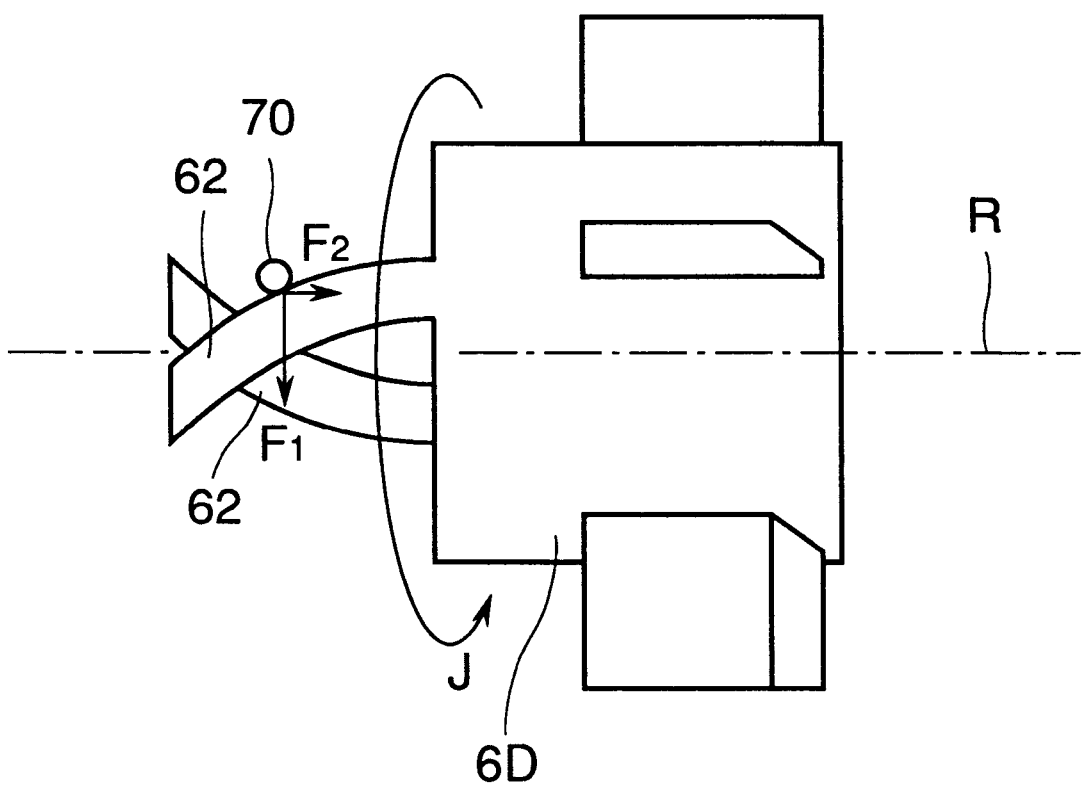
FIG. 6 illustrates a part of a construction of a one-way clutch device according to a sixth embodiment.

FIG. 6 illustrates a part of a construction of a one-way clutch device according to a sixth embodiment. The construction shown in FIG. 6 is for use in the magnetic tape drive apparatus as shown in FIG. 8, and includes a shaft (not shown), a rotating vane member, and a clutch spring (only free end portion 70 thereof is shown).

The rotating vane member 6D of the sixth embodiment is provided with guide projections 62 which extend at an angle with the rotational axis R of the shaft 5 as shown in FIG. 6. When the shaft 5 is rotated together with the clutch spring 7 tightly fitted thereto, the free end portion 70 of the clutch spring 7 abuts the guide projections 62, causing the vane member 6D to rotate.

Just as in the fifth embodiment, the free end portion 70 exerts a force on the rotating vane member 6D via the guide projections 62 which are at an angle with the rotational axis R of the shaft 5. The exerted force is resolved into a force F1 and a force F2. The force F1 causes the vane member 6D to rotate about the shaft 5 and the force F2 causes the vane member to slide along the shaft 5.

Thus, for example, if the clutch spring 7 becomes loose when the shaft 5 is rotating in the direction shown by arrow J, the rotating vane member 6D is moved along the shaft 5 without being locked after the engagement portion 32 has collided with the rotating vane member 6D. Then, the rotating vane member 6D moves back along the shaft 5 toward its original position with the aid of the force F2.

Figure 14:
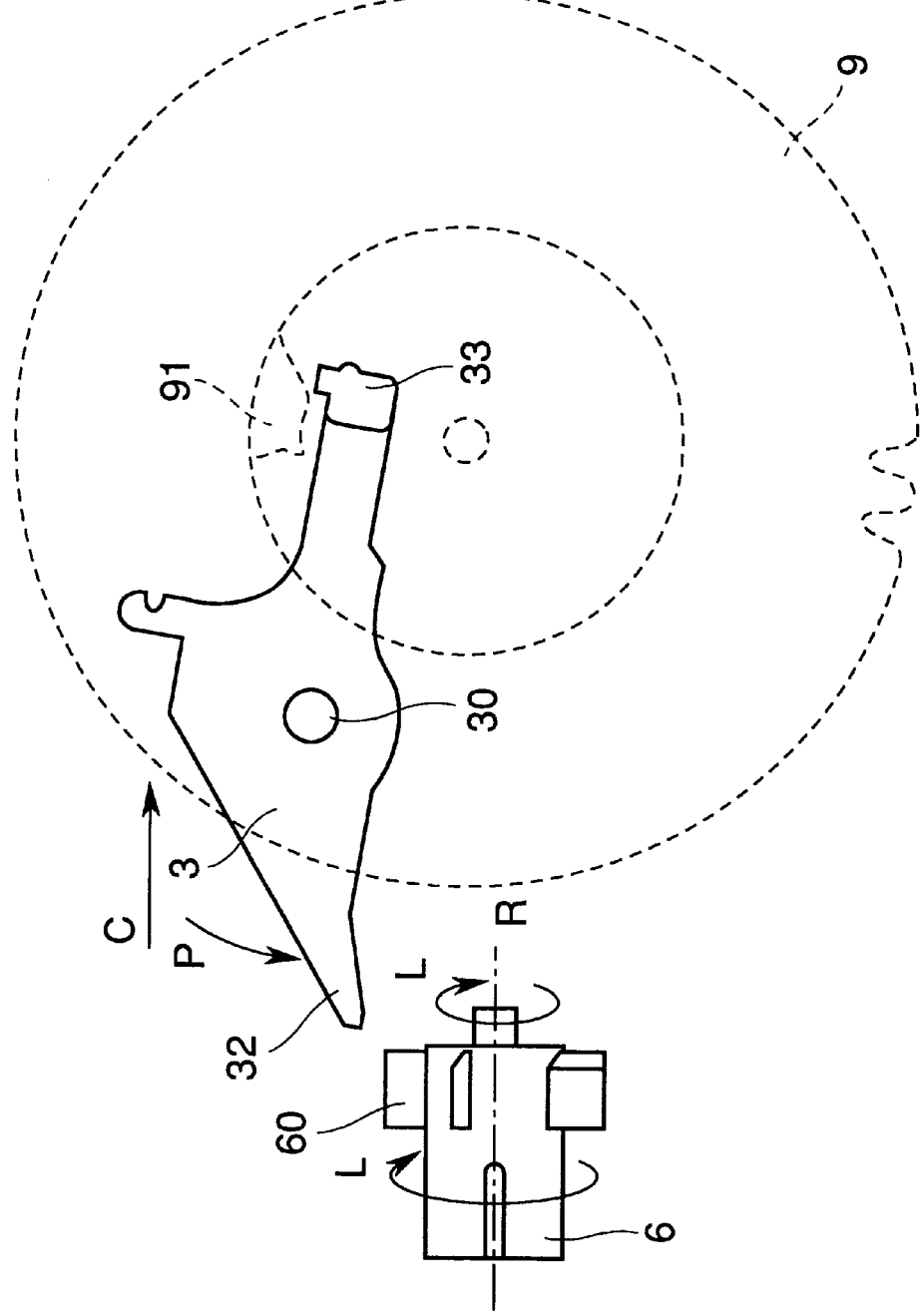
FIG. 14 illustrates the trigger member 3 shortly after the trigger member 3 has been repelled out of the rotation path of the vane 60.

At least one single guide projection 62 is required for the clutch spring 7 to engage the rotating vane member 6D to drive into rotation relative to the shaft 5. Use of more than two guide projections 62 is more effective in quickly transmitting a force that causes the vane member 6D to rotate in a reverse direction for the same reason described for the conventional rotating vane 60 shown in FIG. 14.

Seventh embodiment

Figure 7A:
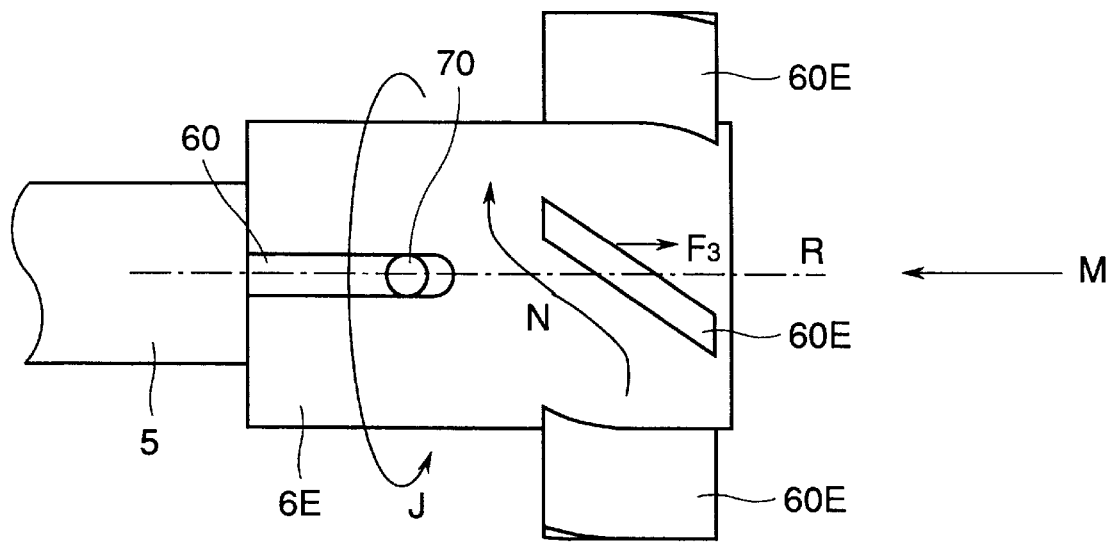
FIGS. 7A and 7B illustrate a part of a construction of a one-way clutch device according to a seventh embodiment.
Figure 7B:
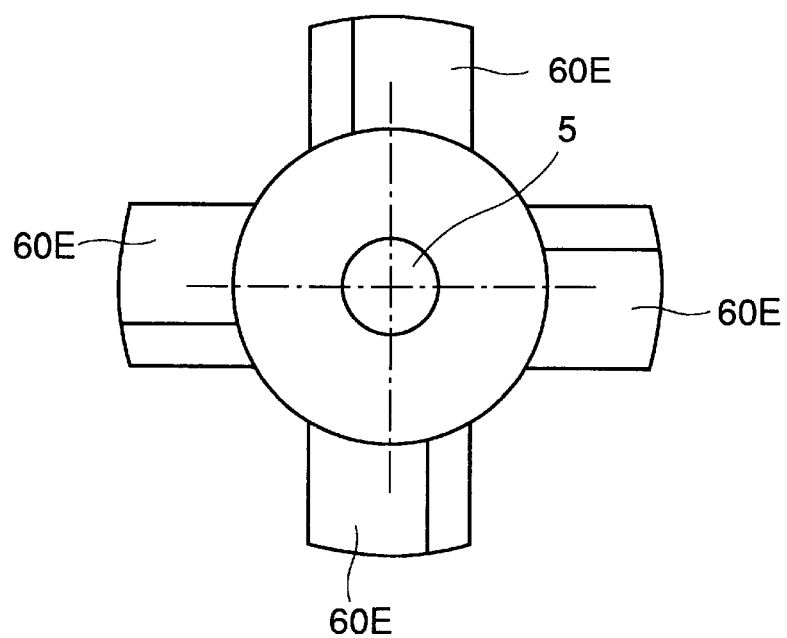

FIGS. 7A and 7B illustrate a part of a construction of a one-way clutch device according to a seventh embodiment. The construction shown in FIGS. 7A and 7B is for use in the magnetic tape drive apparatus as shown in FIG. 8. FIG. 7A is a side view and FIG. 7B is a front view as seen in a direction shown by arrow M.

The shaft 5 and clutch spring 7 are of the similar construction to the conventional art shown in FIG. 10 where the clutch spring 7 is tightly fitted to the shaft 5. The rotating vane member 60E has vane 60E obliquely mounted to the rotating vane member 60E so that the vanes 60E are at an angle with the axis of the shaft 5. When the vane member 60E rotates, the vanes 60E cause the air flows in a direction shown by arrow N so that the vanes 60E behaves like a wing of an air plane and receives an urging force F3 in a direction opposite to the arrow M.

Thus, if the clutch spring 7 becomes loose when the shaft 5 rotates in the direction shown by arrow J, the rotating vane member 60E is moved along the shaft 5 without being locked after the engagement portion 32 has collided with the rotating vane 60. Then, the rotating vane member 6E moves back along the shaft 5 toward its original position with the aid of the force F3. This ensures that the engagement portion 32 engages the vane 60E without being locked.

The invention being thus described, it will be obvious that the same may be varied in many ways. Such variations are not to be regarded as a departure from the spirit and scope of the invention, and all such modifications as would be obvious to one skilled in the art are intended to be ;included within the scope of the following claims.

What is claimed is:

1. A one-way clutch comprising:

a shaft having a rotational axis and being rotatable about the rotational axis in a first direction and in a second direction rotationally opposite the first direction;

a rotating member linearly movable in a third direction along the rotational axis and a fourth direction axially opposite the third direction, said rotating member being yieldably biased in the third direction with respect to the shaft; and a rotation-transmitting member transmitting rotation of said shaft to said rotating member in the absence of a rotational load exerted on said rotating member and not transmitting the rotation of said shaft to said rotating member when said shaft rotates in the first direction with a rotational load larger than a predetermined value exerted on said rotating member.

2. The one way clutch according to claim 1, wherein said rotation-transmitting member is a coil spring through which said shaft extends and over which said rotating member loosely fits, said rotating member is movable relative to the coil spring in the third and fourth directions but not rotatable relative to the coil spring, the coil spring yieldably biasing said rotating member in the third direction;

wherein said rotating member causes said rotation-transmitting member to loosely engage said shaft when said shaft rotates in the first direction with the rotational load larger than the predetermined value exerted on said rotating member; and said rotating member allows said rotation-transmitting member to tightly engage said shaft when no rotational load is exerted on said rotating member.

3. The one way clutch according to claim 2, wherein said coil spring includes a closely-wound coil and a loosely-wound coil, the closely-wound coil and the loosely-wound coil being aligned in line and connected to each other, the closely-wound coil engaging said rotating member to transmit the rotation of said shaft to said rotating member and the loosely-wound coil yieldably biasing the rotating member in the third direction.

4. The one way clutch according to claim 3, wherein the loosely-wound coil has a larger diameter than the closely-wound coil.

5. The one way clutch according to claim 3, wherein said shaft has a large diameter on which the closely-wound coil rides and a small diameter on which the loosely coil rides.

6. The one way clutch according to claim 2, wherein said rotating member is a cylinder which is supported on said shaft and has a slit formed therein, the slit generally extending at an angle with the rotational axis;

wherein said coil spring has a free end portion extending through the slit radially outwardly from said shaft and the free end portion abuts a part of said rotating member to bias said rotating member in the third direction.

7. The one way clutch according to claim 1, wherein said rotating member is a cylinder which is supported on said shaft and has a slit formed therein, the slit generally extending at an angle with the rotational axis;

wherein the coil spring biases said rotating member in the third direction and one end of the coil spring extends through the slit radially outwardly of said shaft.

8. The one way clutch according to claim 1, further including a surface extending substantially perpendicular to the rotational axis, wherein said rotating member is molded from a resin and has a resilient projection, the projection resiliently abutting the surface to bias said rotating member in the third direction.

9. The one way clutch according to claim 1, wherein said rotating member is provided with a flat projection having a surface lying in a plane at an angle with the rotational axis of said shaft, the flat projection generating a biasing force acting on said rotating member in the third direction when said rotating member rotates.

10. A brake controlling apparatus comprising:
 a shaft having a rotational axis and being rotatable about the rotational axis in a first direction and in a second direction rotationally opposite the first direction;
 a rotating member linearly movable in a third direction along the rotational axis and a fourth direction axially opposite the third direction, said rotating member being yieldably biased in the third direction with respect to the shaft; and
 a rotation-transmitting member transmitting rotation of said shaft to said rotating member in the absence of a rotational load exerted on said rotating member and not transmitting the rotation of said rotating member when said shaft rotates in the first direction with a rotational load larger than a predetermined value exerted on said rotating member;
 a brake member, applying a braking force to a drive shaft when said brake member engages the drive member;
 a brake-disabling member moving in the third direction to cause said brake member to move into engagement with the drive member, and moving in the fourth direction to cause said brake member to move out of engagement with the drive member;
 a biasing member, applying a biasing force to said brake-disabling member in the third direction; and
 a cam, engaging said brake-disabling member to move said brake-disabling member in the fourth direction against the biasing force until said brake-disabling member enters a rotational path of said rotating member;
 wherein said drive shaft repels said brake-disabling member entering the rotational path so that said brake-disabling member disengages from said cam and moves in the third direction with the aid of the biasing force of said biasing member.

11. The brake controlling apparatus according to claim 10, wherein said brake-disabling member includes an engaging piece rotatably mounted thereon, the engaging piece having a first portion and a second portion;
 wherein said cam engages the first portion to move said brake-disabling member in the fourth direction against a biasing force of said biasing member so that the second portion moves into engagement with said rotating member to exert the rotational load larger than the predetermined value on said rotating member and is repelled by said rotating member out of engagement with said rotating member, said engaging piece rotates after having repelled to cause the first portion to disengage from said cam.

12. The brake controlling apparatus according to claim 11, wherein said drive member is connected to a platform for driving a reel mounted thereon in rotation, the reel having a magnetic tape wound thereon.

13. A one-way clutch comprising:
 a shaft rotatable about a rotational axis in a first rotational direction and a second rotational direction opposite the first direction;
 a rotor coaxially oriented with respect to the shaft and being linearly movable axially along the rotational axis;
 a first resilient portion of a coil spring for transmitting torque between the shaft and the rotor in the first direction, but not the second direction if a rotational load exceeds a predetermined threshold; and
 a second resilient portion of the coil spring resiliently biasing the rotor in a generally axial direction along the rotational axis.

14. The one-way clutch according to claim 13 wherein the first resilient portion comprises a tightly wound portion that engages an outer circumference of the shaft in a press-fit manner without the rotational load.

15. The one-way clutch according to claim 13 wherein the coil spring comprises a tightly wound portion attached to the loosely wound portion with a radial gap between the loosely wound portion and the shaft.

16. The one-way clutch according to claim 13 wherein the first resilient portion has adjacent windings that contact one another and wherein the second resilient portion has adjacent windings with gaps between each another.

17. The one-way clutch according to claim 13 wherein the first resilient portion has a lesser diameter than the second resilient portion.

* * * * *